US005497905A

United States Patent [19]

Vogelpohl et al.

[11] Patent Number: 5,497,905

[45] Date of Patent: Mar. 12, 1996

[54] VENDING MACHINE, AND RELEASE MECHANISM

[75] Inventors: Gregory J. Vogelpohl; Phillip C. South, both of Orlando, Fla.

[73] Assignee: ECC International Corp., Orlando, Fla.

[21] Appl. No.: 265,711

[22] Filed: Jun. 24, 1994

[51] Int. Cl.$^6$ ..................... G07F 11/16; B65G 59/00

[52] U.S. Cl. ..................... 221/226; 221/298; 221/279

[58] Field of Search ..................... 221/289, 298, 221/299, 301, 226, 279

[56] References Cited

U.S. PATENT DOCUMENTS

| | | | |
|---|---|---|---|
| 3,370,749 | 2/1968 | Nathan et al. | 221/301 |
| 4,405,059 | 9/1983 | Kull | 221/298 |
| 4,742,936 | 5/1988 | Rein | 221/279 |

FOREIGN PATENT DOCUMENTS

| | | | |
|---|---|---|---|
| 0551284 | 7/1993 | European Pat. Off. | 221/301 |
| 646381 | 9/1962 | Italy | 221/301 |
| 404195698 | 7/1992 | Japan | 221/298 |
| 405197877 | 8/1993 | Japan | 221/298 |
| 93003462 | 2/1993 | WIPO | 221/301 |

*Primary Examiner*—H. Grant Skaggs
*Attorney, Agent, or Firm*—James H. Beusse

[57] ABSTRACT

A method of operating a vending machine in response to the selection generation of a preselected vending signal. The vending machine includes at least one supporting means for slidably receiving a plurality of vended articles disposed in row formation thereon with adjacent vended articles being engaged. In the practice of this method, the vended articles are contained in the row formation against slidable displacement on the supporting means toward an open end thereof, and one of the vended articles disposed in the row formation at least adjacent the open end of the supporting means is slidably displaced therefrom upon the generation of the preselected vending signal. The remaining vended articles in the row formation are retained against slidable displacement on the supporting means toward the open end thereof during the slidable displacement of the one vended article from the open end of the supporting means.

20 Claims, 7 Drawing Sheets

VENDING MACHINE, AND RELEASE MECHANISM

FIELD OF THE INVENTION

This invention relates in general to vending machines and in particular to those of the refrigerated type, a method of operating a vending machine, and a release mechanism.

BACKGROUND OF THE INVENTION

In the past, various different schemes have been utilized to effect the selective vending of a vended article from a vending machine in response to a preselected vending signal. To effect the operation of one of the past vending machines, a purchaser actuated a vended article selection device, such as a selection button or set thereof for instance, of the one past vending machine, thereby to indicate the vended article selected for purchase by the purchaser, and the purchaser also inserted the necessary amount of money into a money counting device of the one past vending machine for purchasing the selected vended article. In response to the aforementioned actuation of the vended article selection device and the receipt of the necessary purchase money in the money counting device, circuitry provided in the one past vending machine was energized to establish the preselected vending signal, and upon the generation of the preselected vending signal, a vended article delivery or dispensing device was selectively operated to dispense the selected vended article into a receptacle or removal container of the one past vending machine permitting the removal therefrom of the selected vended article by the purchaser.

Of course, various different vended article dispensing devices were employed in various different vending machines to effect the delivery of the selected vended article to the purchaser, and one such article dispensing device is illustrated in U.S. Pat No. 5,097,986 issued Mar. 24, 1992. In this patent, a vended article dispensing device is illustrated as a set of coils that are selectively conjointly rotatable in motor driven fashion about the longitudinal axis of the coils. A plurality of vended articles are disposed in horizontally, displaceably supported compartments in the coils, and upon the selected conjoint rotation of the coils, the vended articles contained in the coils are conjointly moved forwardly by a certain distance toward a front opening in a space supporting the vended articles. Thus, in response to the selected conjoint rotation of the coils, the forwardmost selected vended article in the coils is passed through the front opening in the space supporting the vended articles and falls through a drop chute into a removal container from which it can be taken by the purchaser.

SUMMARY OF THE INVENTION

In general and in one form of the invention, a method is provided for operating a vending machine in response to the selective generation of a preselected vending signal. The vending machine includes at least one supporting means for slidably receiving a plurality of vended articles disposed in row formation with adjacent vended articles in the row formation engaging each other, and the at least one supporting means has an open end with one of the vended articles in the row formation being disposed at least adjacent the open end. In the practice of this method, the vended articles are contained in the row formation against slidable displacement on the at least one supporting means, and the one vended article is slidably displaced from the open end of the at least one supporting means upon the selective generation of the preselected vending signal. The remaining articles in the row formation are retained against slidable displacement on the at least one supporting means toward the open end thereof when the one vended article is slidably displaced from the open end of the at least one supporting means.

Also in general, a vending machine for selectively vending a plurality of vended articles is provided in one form of the invention. The vending machine has a cabinet, and at least one supporting means is arranged in the cabinet for slidably receiving the vended articles in row formation with adjacent vended articles in the row formation being engaged. The at least one supporting means has an open end, and a pair of abutment means associated with the at least one supporting means are operable generally for movement between a pair of positions. One of the abutment means in one of it positions is disengaged from one of the vended articles disposed in the row formation adjacent the open end to permit the sliding displacement of the one vended article from the at least one supporting means through the open end, and the other of the abutment means in one of its positions is engaged with another of the vended articles next adjacent the displaced one vended article in the row formation to retain the remaining vended articles in the row formation against sliding displacement on the at least one supporting means when the one abutment means is in its one position. The other abutment means is moveable to the other of its positions disengaged from the another vended article in the row formation to permit the sliding displacement of the remaining vended articles in the row formation on the at least one supporting means toward the open end, and the one abutment means is movable to the other of its positions into engagement with the another vended article to retain the remaining vended articles in the row formation against sliding displacement from the at least one supporting means through the open end when said other abutment means is in its other position.

Further, in general and in one form of the invention, a release mechanism is provided for controlling the passage therepast of a plurality of vended articles arranged generally in row formation in the vending machine. The release mechanism has a casing disposed in the vending machine, and the casing includes at least one sidewall arranged at least adjacent some of the vended articles in the row formation, and an opening intersecting the at least one sidewall. A pair of sets of hinged means are pivotally arranged in the casing for movement between one position extending in part from the opening beyond the at least one sidewall into passage preventing engagement with one of the vended articles in the row formation and another position disposed at least in part within the opening in passage permitting disengagement from another of the vended articles adjacent the one vended article in the row formation. Driving means is reciprocally movable in the casing and extends in part within the opening into pivotal association with adjacent ones of the hinged means of the hinged means sets for driving one of the hinged means sets between the one position and the another position thereof and for conjointly driving the other of the hinged means sets between the another position and the one position thereof.

The exemplifications set and herein illustrate the preferred embodiments of the present invention in one form thereof, and such exemplifications are not to be construed as limiting either the scope of the disclosure or the scope of the invention in any manner.

DETAILED DESCRIPTION OF THE PREFERRED EMBODIMENTS

Figure 1:
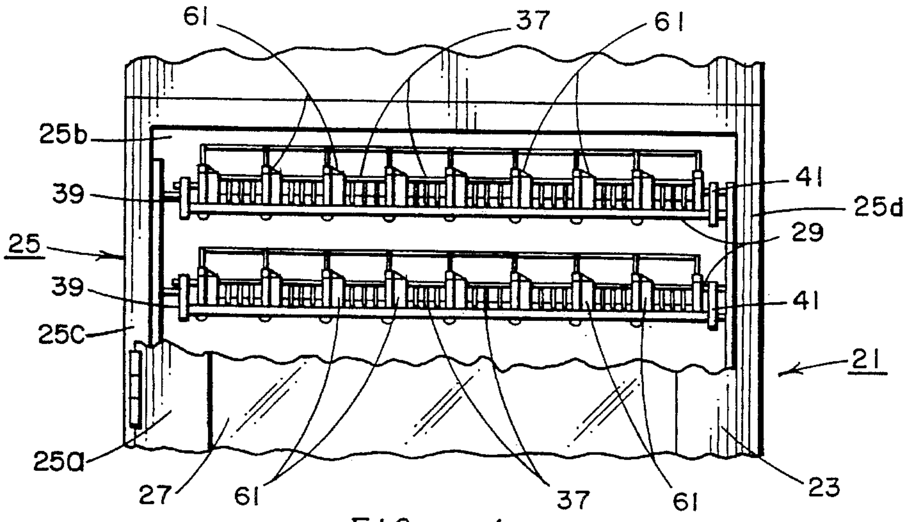
FIG. 1 is a partial fragmentary front elevational view of a vending machine in one form of the invention showing a plurality of trays mounted therein in tiers with each tray defining a plurality of side-by-side channels for slidably receiving a plurality of vended articles in row formation and illustrating principles which may be practiced in a method of operating a vending machine also in one form of the invention.

Referring now to FIG. 1, there is shown in one form of the invention a vending machine 21 having a cabinet 23 formed by a plurality of enclosure panels 25 including a hinged, openable front panel 25a shown partially broken away which may be releasably locked in a closed position to provide controlled selective access to the interior of the cabinet. Front panel 25a frames a pane 27 of a generally transparent material, such as for instance a clear plastic or the like, which is also shown partially broken away, and the transparent pane provides a clear view into the interior of the cabinet when the front panel is closed. Vending machine 21 is contemplated to be refrigerated by a refrigeration system as well known to the art; however, the components of such refrigeration system are omitted for the sake of brevity of disclosure and drawing simplification.

Figure 2:
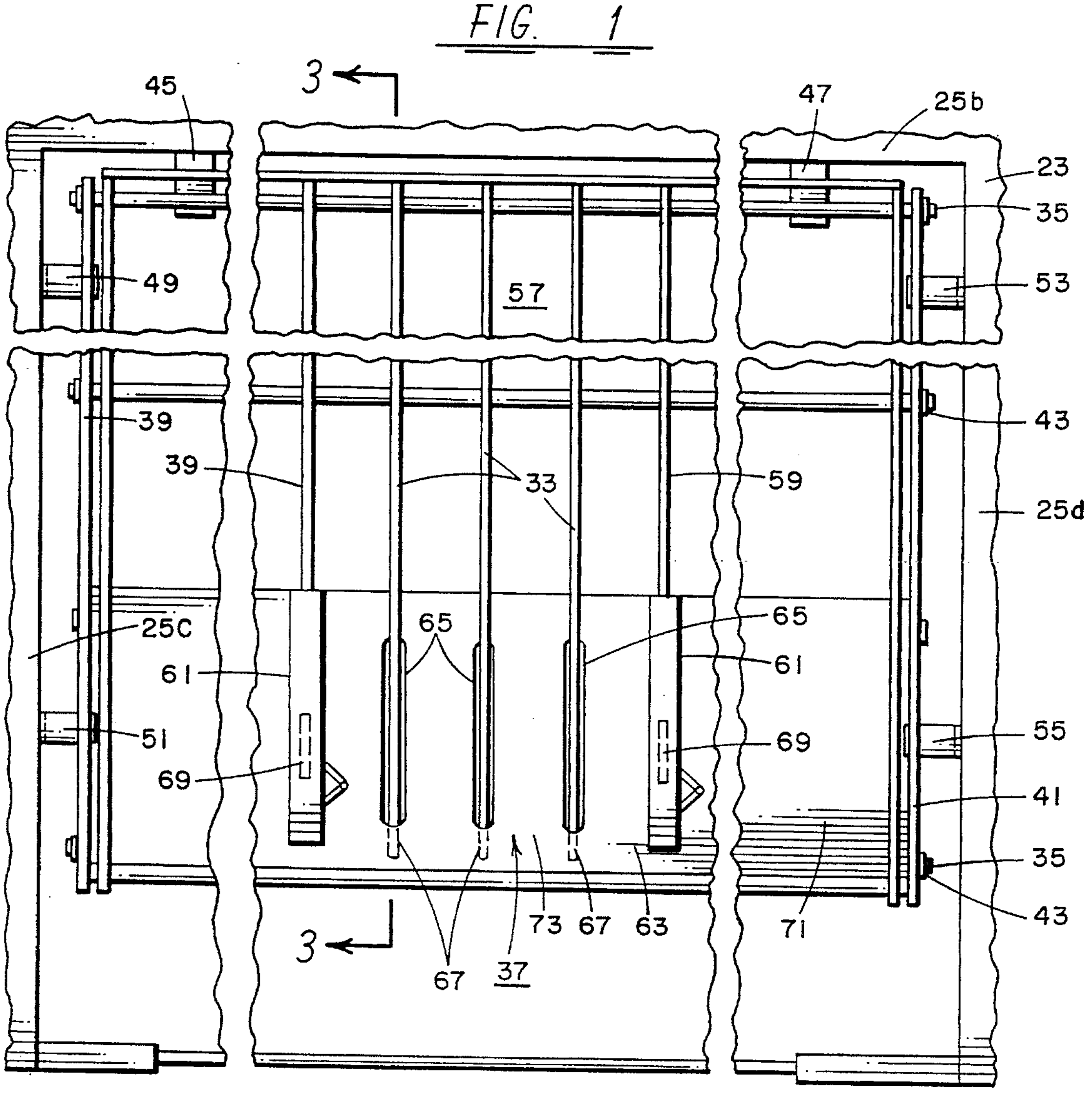
FIG. 2 is an enlarged plan view of one of the trays taken from FIG. 1 and partially broken away to illustrate one of the channels of such tray.
Figure 3:
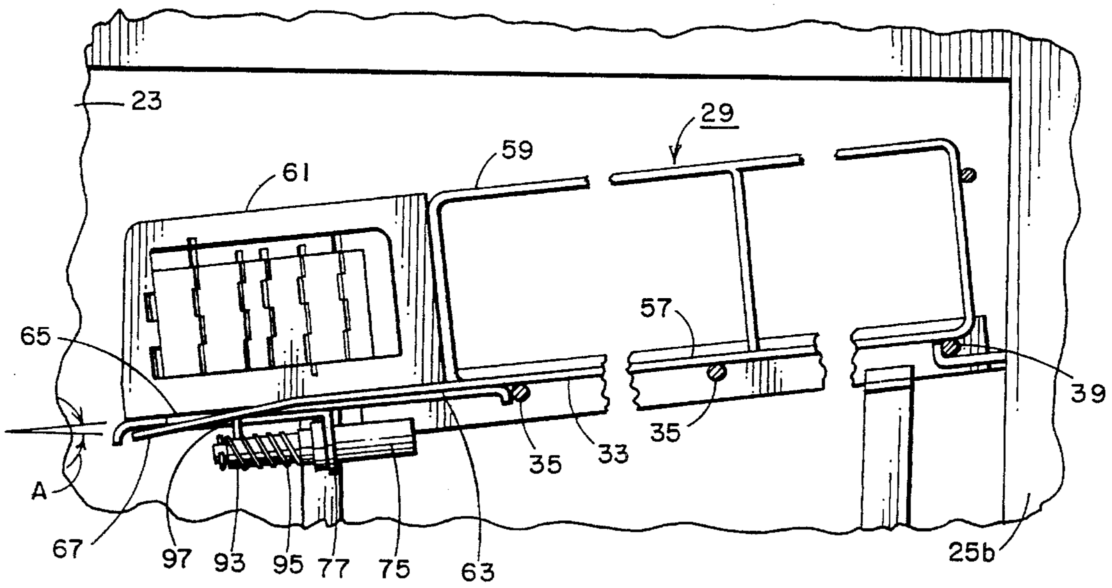
FIG. 3 is a sectional view taken along line 3—3 in FIG. 2.
Figure 5:
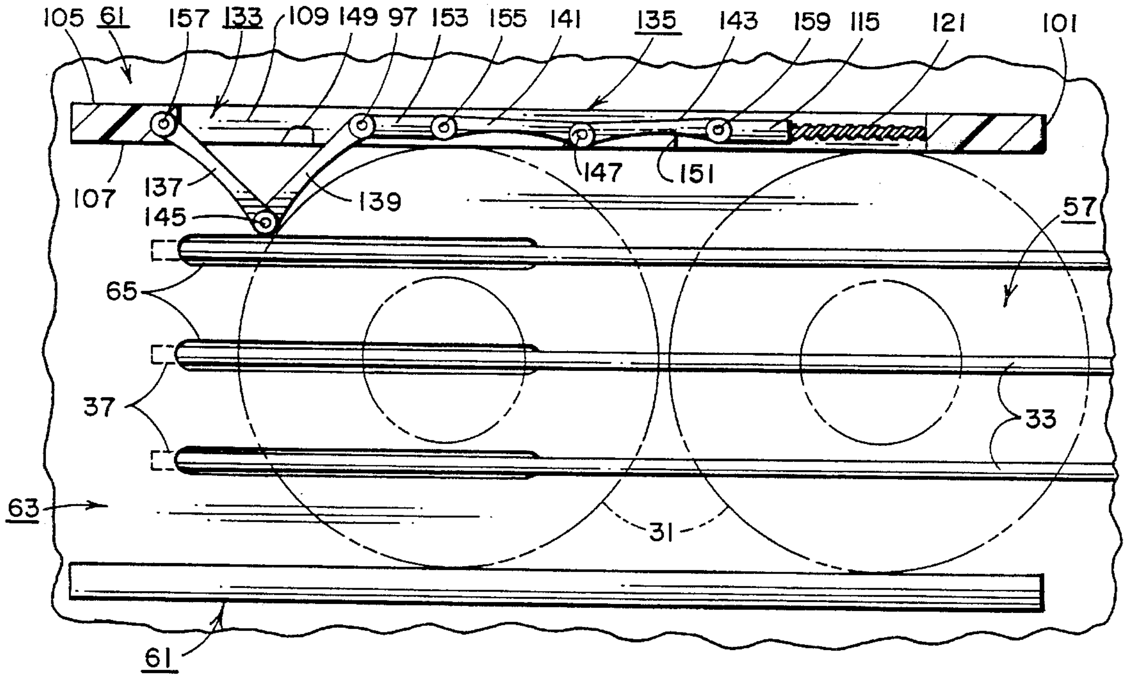
FIG. 5 is a sectional view taken along line 5—5 in FIG. 4 and illustrating a pair of abutment means in one position thereof for controlling the passage of the vended articles in each channel of each tray.
Figure 4:
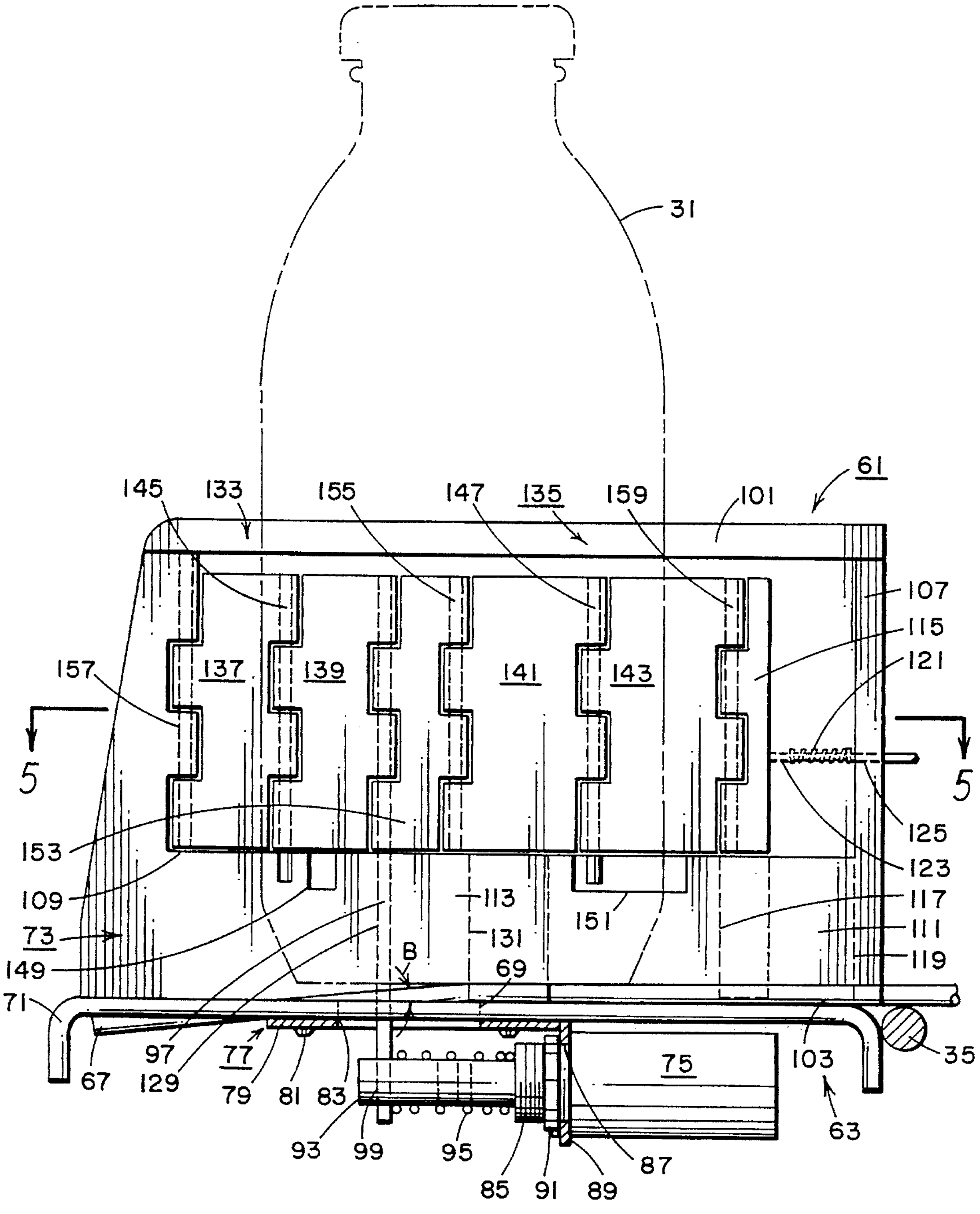
FIG. 4 is an enlarged fragmentary view taken from FIG. 3 and illustrating a release mechanism in one form of the invention for the vended article in each channel of each tray.
Figure 6:
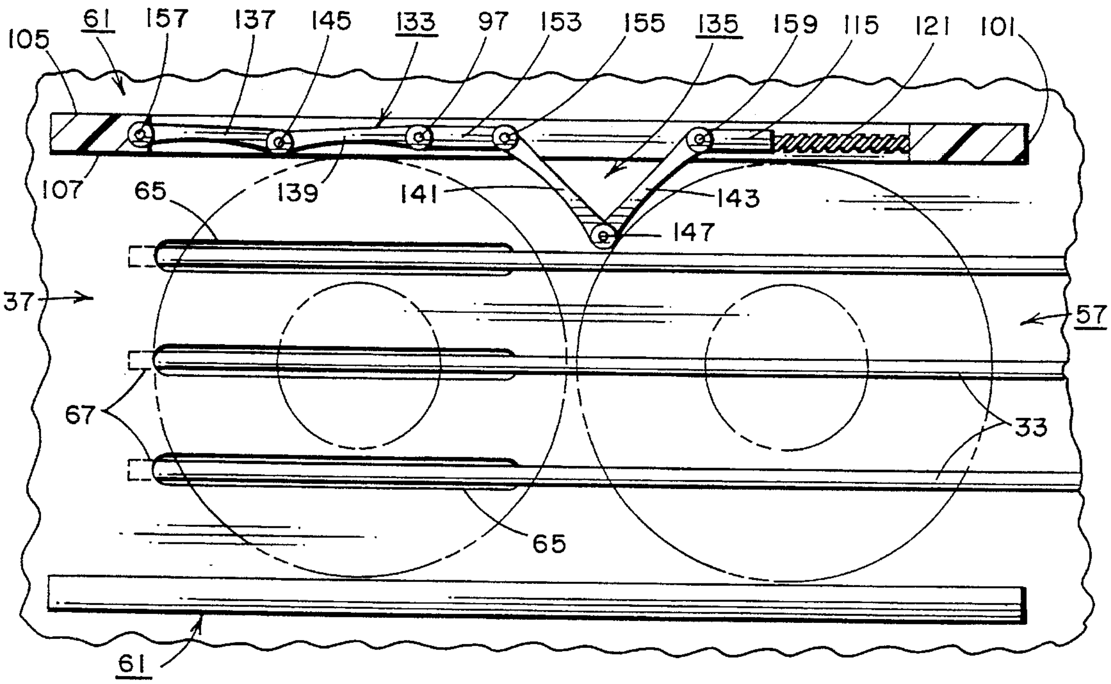
FIG. 6 is a fragmentary view taken from FIG. 5 and illustrating the abutment means in another position thereof for controlling the passage of the vended articles in each channel of each tray.

A plurality of supporting means, such as trays or shelves 29 or the like for instance as shown partially broken away in FIGS. 2 and 3, are provided in cabinet 23 for slidable receiving a plurality of vended articles, such as glass bottles 31 of vended beverages or the like for instance; however, while bottles 31 are illustrated in FIGS. 4–6, such bottles are omitted from FIGS. 1–3 for the sake of drawing simplification and clarity. Trays 29 are each formed of a plurality of spaced metallic wire sections 33 for slidably seating and guiding engagement with glass bottles 31, and the wire sections are interconnected in seated relation on a plurality of metallic cross-rods 35 with both the wire sections and cross-rods being coated with a suitable plastic material as well known in the art. Wire sections 33 of each tray 29 form a plurality of columns or channels 37 arranged generally in side-by-side relation so as to be aligned generally in row formation between front panel **25*a* and a rear panel 25*b* opposite thereto in cabinet 23, and bottles 31 are received in row formation in the channels with adjacent bottles being engaged with each other. Each tray 29 is provided with a pair of opposite side mounting bars 39,41 through which cross-rods 35 extend, and a set of jam washers 43 are fixedly received on at least some of the cross-rods in displacement preventing engagement with the side mounting bars, respectively, as best seen in FIG. 2**.

A pair of sets of rear mounting brackets 45,47 are secured to rear panel **25*b* of cabinet 23 by suitable means, such as a plurality of screws (not shown) or the like for instance, and the rear mounting brackets releasably receive or seat in mounting engagement one of the cross-rods 35 of each tray, respectively. Pairs of opposed sets of side mounting brackets 49,51 and 53,55 are respectively secured to opposite side panels 25*c*,25*d* of cabinet 23 by suitable means, such as a plurality of screws (not shown) or the like for instance, and the opposed side mounting brackets respectively releasably receive or seat in mounting engagement opposite mounting bars 39,41 of each tray 29. Thus, trays 29 are mounted or otherwise arranged in tiers within cabinet 23, as best seen in FIGS. 3 and 4, and it may be noted that the trays are canted or sloped in a direction from rear panel 25*b* toward front panel 25*a* of the cabinet at a preselected angle A, generally about ten degrees. It is contemplated that trays 29 may be mounted in cabinet 23 at various other preselected angles different than that discussed above within the scope of the invention. The preselected angle or slope of trays 29 mounted in cabinet 23 establishes a gravity feed of bottles 31 in the row formation thereof in channels 37 thereby to slidably urge the bottles toward front panels 25*a*** of the cabinet and to maintain at least some of adjacent bottles slidably engaged with each other in each channel of the trays.

As best seen in FIGS. 2 and 3, a set of adjacently spaced wire sections 33 of trays 29 define a base or base wall 57 in each channel 37 of the trays for slidably receiving bottles 31 (not shown), and a pair of generally upstanding wire sections 33 define at least in part a pair of opposite sides or sidewalls 59 of the channels for guiding relation with the bottles to maintain the row formation thereof in each channel 37. Of course, adjacent channels 37 of trays 29 share opposite sides 59, and forming a part of some opposite sides 59 is a plurality of release mechanisms 61 for controlling the passage of bottles 31 in the row formation thereof in channels 37, as discussed in greater detail hereinafter.

Each tray 29 is provided with a slide means or lip 63 formed of a suitable sheet material, such as a sheet steel or the like for instance, and the lip forms a part of the channel bases 57 extending across the tray into mounting or locating engagement with opposite mounting bars 39,41. Lip 63 has a plurality of sets of slots 65 arranged in each channel 37 of trays 29 to receive the forward or free end portions 67 of wire sections 33 defining channel bases 57, as best seen in FIGS. 2–4. Free end portions 67 are predeterminately bent or otherwise formed to extend through slots 65 in blending relation with lip 63, and it may be noted that free end portions 67 are arranged to define a preselected angle B with lip 63, as best seen in FIG. 4. The blending relation of free end portions 67 and lip 63 provide a smooth transition of bottles 31 sliding from channel bases 57 onto lip 63, and the angular relation of bent free end portions 67 and lip 63, i.e., preselected angle B, provides added impetus to bottles 31 sliding onto the lip, as further discussed hereinafter. Release mechanisms 61 forming a part of some of sides 59 in each channel 37 are seated on lip 63 in overlaying relation with another set of slots 69 provided through the lip.

An end portion 71 integrally formed on lip 63 extends across each channel 37 of trays 29 and is disposed in spaced apart relation adjacent front panel 25*a* on cabinet 23 of vending machine 21. Thus, it may be noted that lip 63 defines in part an open end or end portion 73 for each channel 37 on trays 29, and since trays 29 are sloped at the preselected angle A in cabinet 23 of vending machine 21, each channel 37 on trays 29 defines a ramp along which bottles 31 are slidable in row formation toward open end 73 of each channel. It may be further noted that the leading one of bottles 31 in the row formation thereof in each channel 37 is predeterminately located in a preselected lead position, i.e., in port seated on wire sections 33 defining base 57 of the channel and in port extending into spaced apart overlaying relation with bent free end portions 67 of such wire sections defining the base, as best seen in FIG. 4. While specific construction of trays 29 along with the mounting arrangement thereof in cabinet 23 is discussed hereinabove for the purpose of disclosure, it is contemplated that various other types of trays having different constructions and mounting arrangements may be utilized in cabinet 23 of vending machine 21 within the scope of the invention.

A plurality of solenoids or solenoid means 75 are mounted to the underside of lip 63 adjacent each channel 37 of trays 29 for effecting the actuation of release mechanism 61; however, for the sake of drawing simplification and brevity of disclosure, only one of such solenoids and its mounting arrangement to the lip is discussed hereinafter with respect to FIG. 4. A mounting bracket 77 for solenoid 75 is provided with a leg portion 79 arranged in mounting engagement with the underside of lip 63 by a set of suitable mounting means, such as for instance screws 81 or the like, and the screws extend through the lip into mounting engagement with release mechanism 61 disposed on the upper side or surface of the lip. Leg portion 79 of mounting bracket 77 includes a slot 83 arranged in alignment with one of slots 69 in lip 63, and a threaded extension 85 on solenoid 75 extends through an opening 87 in a depending section 89 of the mounting bracket with a part of the solenoid being in abutment with the depending section generally about the opening therethrough. Solenoid 75 is retained in its mounted position against displacement from mounting bracket 77 by suitable means, such as for instance a lock nut 91 or the like, threadedly received on threaded extension 85 of the solenoid and arranged in abutting or locking engagement with depending section 89 of the mounting bracket generally about opening 87 therein. A reciprocally movable armature 93 of solenoid 75 extends in part exteriorly thereof, and resilient means, such as a spring 95 or the like for instance, is biased between threaded extension 85 of the solenoid and a driving means, such as for instance a hinge pin 97 or the like of release mechanism 61, which extends through a receiving hole or aperture 99 provided therefor in the armature generally adjacent its free end.

As best seen in FIG. 1 and 2, adjacent release mechanisms 61 disposed on lip 63 define in part at least one opposite side 59 of channels 37 on each tray 29, and the release mechanisms are arranged generally in alignment with the upstanding wire section 33 which also define in part opposite sides 59 of the channels; however, only one of such release mechanisms is discussed hereinafter with respect to FIGS. 4 and 5 for the sake of brevity of disclosure and drawing simplification.

Release mechanism 61 is provided with a casing or frame 101 having a base or wall 103 interposed between a pair of generally opposite sidewalls or faces 105,107, and the opposite sidewalls in part define opposite sides 59 of adjacent channels 37 on trays 29 in conjunction with the upstanding wire sections 33 on such trays. Casing base 103 is seated at least in part against the upper surface of lip 63, and screws 81 extend through the casing base as well as lip 63 and solenoid mounting bracket 77, as previously mentioned, into mounting relation with casing 101 thereby to maintain release mechanism 61 against displacement from lip 63. A transverse opening or window 109 through casing 101 respectively intersects opposite faces 105,107 thereof, and a pair of spaced apart guide slots 111,113 in the casing respectively intersect the transverse window and casing base 103.

Anchor means or slide 115 extends at least in part into transverse opening 109 and guide slot 111 of casing 101, and the anchor slide is reciprocally or slidably movable in the guide slot between a pair of predeterminately spaced apart opposed abutment or end surfaces 117,119 provided in the guide slot on the casing. Resilient means, such as for instance a spring 121 or the like, is biased between anchor slide 115 and casing 101, and the spring is disposed about a retainer pin 123 therefor carried by the anchor slide with a distal portion of the retainer pin being reciprocally received in a bore 125 provided therefor in the casing. The compressive force of spring 121 acting on anchor slide 115 urges it toward seating or abutting engagement with abutment surface 117 of guide slot 111.

Driving means or hinge pin 97 extends into transverse opening 109 and guide slot 113 in casing 101 and is slidable or reciprocally movable in the guide slot between a pair of predeterminately spaced apart opposite abutment or end surfaces 129,131 provided in the guide slot on the casing. It may be noted that hinge pin 97 is pivotally associated or otherwise arranged between a pair of sets of hinged means or abutment means, indicated generally at 133,135, for driving them between one position, such as a channel blocking position or the like for instance, extending in part from transverse opening 109 of casing 101 beyond its opposite face 107 and another position, such as a channel opening position or the like for instance, disposed at least in part within the transverse opening, respectively, as discussed hereinafter. Abutment means 133, 135 respectively include a pair of hinged or pivoted members 137,139 and 141,143 pivotally interconnected by hinge pins 145,147, and a pair of recesses 149,151 are provided in opposite face 107 of casing 101 intersecting transverse opening 109 thereof to receive parts or lower ends of hinge pins 145,147 upon the aforementioned movement of the abutment means between their respective positions. Pivoted member 139 of abutment means 133 is pivotally interconnected by hinge pin 97 to a pivot connector 153, and pivotal member 141 of abutment means 135 is also pivotally interconnected by another hinge pin 155 to the pivot connector which is interposed between pivoted members 139,141 within transverse opening 109 in casing 101. Of course, hinge pin 97 extends through its guide slot 113 in casing 101 as well as aligned slots 69, 83 in lip 63 and solenoid mounting bracket 77 so as to be disposed in receiving hole 99 therefor in solenoid armature 93, as previously mentioned. Pivoted member 137 of abutment means 133 is also pivotally interconnected with casing 101 by a hinge pin 157 carried in the casing, and pivoted member 143 of abutment means 135 is also pivotally interconnected by another pivot pin 159 with anchor slide 115. To complete the description of release mechanism 61 as well as vending machine 21, it may be noted that the compressive force of solenoid spring 95 acting on hinge pin 97 urges hinge pin 97 into seated or abutting engagement with opposite end surface 129 of guide slot 113 in casing 101; therefore, when hinge pin 97 is engaged with opposite end surface 129, it may be further noted that the hinge pin and pivot connector 153 are urged by the compressive force of the solenoid spring in a direction to pivotally urge abutment means 133 toward its aforementioned channel closing position extending in part beyond opposite face 107 into channel 37 while pivotally urging or driving abutment means 135 toward its aforementioned channel opening position disposed at least in part within transverse opening 109 of casing 101.

In the operation of vending machine 21, a vended article selection device (not shown) of a type well known to the art, such as a set of selection push-buttons or the like for instance, may be selectively actuated by a purchaser to select from a particular channel 37 of a particular tray 29 a bottle 31 of the vended beverage the purchaser desires to be dispensed from the vending machine. The purchaser will also insert the necessary amount of money into a money counting device (not shown) of a type well known to the art in vending machine 21 to effect the actuation of such money counting device. In response to the actuation of the aforementioned vended article selection device and the money counting device, circuitry (not shown) of a type well known to the art and interconnected with such selection device and money counting device as well as with solenoids 75 in vending machine 21 is energized to establish a preselected vending signal for energizing one of solenoids 75 to effect the dispensing of a bottle 31 of the selected vended beverage from the aforementioned particular channel 37 of a particular tray 29 in vending machine 21, as discussed in detail hereinbelow. Since the aforementioned vended article selection device, the money counting device and the circuitry associated therewith form no part of this invention, a detailed discussion thereof is omitted for the sake of brevity of disclosure and drawing simplification.

Assume for convenience of discussion that channels 37 of trays 29 in vending machine 21 are filled with bottles 31 of the vended beverages in the row formation thereof. The compressive force of solenoid spring 95 acts on hinge pin 97 urging it into seating engagement with opposite end surface 129 of guide slot 113 in casing 101 and conjointly urges armature 93 of solenoid 75 into its de-energized position when the solenoid is de-energized, as seen in FIG. 4. Thus, the compressive force of solenoid spring 95 is contained or otherwise caged when hinge pin 97 is engaged with opposite end surface 129 of guide slot 113, and upon the engagement of the hinge pin with the opposite end surface, abutment means 133 is disposed in its channel closing or blocking position extending at least in part from the transverse opening 109 in casing 101 beyond opposite face 107 thereof into passage preventing engagement with a leading one of bottles 31 disposed on base 57 of channel 37 adjacent open end 73 thereof. Of course, pivoted member 139 of abutment means 133 engages the aforementioned leading one of bottles 31; therefore, when abutment means 133 is in its channel blocking position engaging such leading one of the bottles, such bottles are contained against sliding displacement in channels 37 toward open end 73 thereof. The above discussed containing engagement of abutment means 133 with the leading one of bottles 31 is effective to maintain such leading bottle in its preselected leading position, in part seated on base 57 of channel 37 and in part extending in spaced apart overlaying relation with bent portions 67 of wire sections 33 extending through slots 65 in lip 63, as best seen in FIG. 4. It may also be noted that when hinge pin 93 is engaged with opposite end 129 of guide slot 113, the hinge pin is effective through pivot connector 153 to dispose abutment means 135 in its channel opening or bottle passing position pivotally withdrawn at least in part into transverse opening 109 of casing 101 so as to be disengaged from another of bottles 31 in the row formation thereof in channel 37 next adjacent or next successive to the aforementioned leading bottle engaged by abutment means 133 in its channel blocking position, as best seen in FIG. 5.

When the aforementioned preselected vending signal is established or selectively generated in vending machine 21 to effect the energization of solenoid 75, as previously discussed, its armature 93 is energized and moved rightwardly (as seen in FIG. 4) into an energized position exerting an actuating force on hinge pin 97 against the compressive force of solenoid spring 95, and both hinge pin 97 and pivot connector 153 are conjointly moved rightwardly with the solenoid armature. This conjoint rightward movement of hinge pin 97 and pivot connector 153 slides the hinge pin in guide slot 113 displacing the hinge pin from opposite end 129 of the guide slot into engagement with its opposite end 131 thereby to limit the conjoint rightward movement of the hinge pin and the pivot connector. In response to this conjoint rightward movement of hinge pin 97 and pivot connector 153, abutment means 133 is conjointly driven or pivotally moved from its channel blocking position into a channel opening (or bottle passing) position withdrawn at least in part into transverse opening 109 of casing 101 disengaging pivoted member 139 of the abutment means from the aforementioned leading one of bottles 31 in the row formation thereof in channel 37, as best seen in FIG. 6. As previously noted, tray 29 is disposed at a preselected angle A (see FIG. 3) in cabinet 23 of vending machine 21 so that base 57 and lip 63 of channel 37 define a ramp along which bottles 31 are slidable or gravity fed toward open end 73 of the channel. Therefore, when abutment means 133 is displaced or disengaged from the leading one of bottles 31 in their row formation in channel 37, such leading bottle is slidably displaced from its aforementioned preselected lead position moving or sliding across bent free end portions 67 of wire sections 33 onto lip 63 adjacent its front edge 71 and through open end 73 of the channel, and in this manner, such leading bottle may be dispensed from tray 29 into a receptacle (not shown) of vending machine 21 accessible to the purchaser of the vended beverage. When the leading bottle in the row formation of bottles 31 in channel 37 is displaced through open end 73 thereof, as discussed above, it may be noted that the aforementioned preselected angle B (see FIG. 4) of bent free end portions of wire sections 33 is arranged to supplement the preselected angle A of channel base 57 thereby to at least assist in the sliding displacement of the leading bottle from the channel. In view of the foregoing, it may be noted that the leading one of bottles 31 disposed in the row formation in channel 37 at least adjacent open end 73 thereof is slidably displaced from the open end of the channel upon the selection generation of the aforementioned preselected vending signal. When abutment means 133 is so moved from its channel blocking position to its channel opening position, it may be noted that abutment means 135 is movable from its channel opening position to its channel blocking position conjointly with such movement of abutment means 133, as discussed below.

In response to the actuating force exerted on hinge pin 97 by armature 93 of solenoid 75 when energized by the preselected vending signal, the hinge pin and pivot connector 153 are conjointly moved rightwardly (as seen in FIG. 4) until the hinge pin becomes engaged with opposite end 131 of guide slot 113, as previously discussed. This conjoint rightward movement of hinge pin 97 and pivot connector 153 is transmitted through the pivot connector to abutment means 135 affecting the driven or pivotal movement thereof from the channel opening position of abutment means 135, as seen in FIG. 5, to the channel blocking position thereof, as seen in FIG. 6. When so moved into its channel blocking position, abutment means 135 is engaged with the bottle in the row formation of bottles 31 in channel 37 which is next adjacent the leading bottle dispensed through open end 73 of the channel in the manner previously discussed; therefore, upon the movement of abutment means 135 into its channel blocking position, it may be noted that the engagement of abutment means 135 with such next adjacent bottle retains the remaining bottles in the row formation against slidable displacement on base 57 and lip 63 of the channel toward the open end thereof when abutment means 133 is disposed in its above discussed channel opening position.

Upon the termination of the selected vending signal, solenoid 75 is de-energized thereby to eliminate the actuating force of solenoid armature 93 acting on hinge pin 97, and the compressive force of solenoid spring 95 is effective to move the solenoid armature leftwardly to its de-energized position and to conjointly move hinge pin 97 leftwardly in guide slot 113 of casing 101 displacing the hinge pin from opposite end 131 of the guide slot into re-engagement with opposite end 129 thereof, as seen in FIG. 4. Thus, the re-engagement of hinge pin 97 with opposite end 129 of guide slot 113 in casing 101 contains or otherwise cages the compressive force of solenoid spring 95, and the leftward movement of the hinge pin in the guide slot is effective to translate or pivotally return abutment means 133 from its channel opening position, as shown in FIG. 6, to its channel blocking position, as shown in FIG. 5. The aforementioned leftward movement of hinge pin 97 is also translated through pivot connector 153 to abutment means 135 to effect the pivotal return movement of abutment means 135 from its channel blocking position, as seen in FIG. 6, to its channel opening position, as seen in FIG. 5, with the return pivotal movements of abutment means 133, 135 occurring at least generally simultaneously. Upon the return pivotal movement of abutment means 135 to its channel opening position, the abutment means is disengaged from the aforementioned next successive bottle in the row formation of the remaining bottles 31 in channel 37, and the remaining bottles slidably move or advance in the channel toward its open end 73 until the now leading bottle in the row formation thereof in the channel engages abutment means 133 disposed in its channel blocking position. Albeit not mentioned hereinabove, the lower end portion of hinge pins 145,147 are received in recesses 149,151 of casing 101 when the abutment means 133,135 are in the channel opening position thereof, respectively.

Of course the above described operation of vending machine 21 may be subsequently repeated in response to the generation of a plurality of the aforementioned preselected vending signals to farther effect the displacement of bottles 31 of the vended beverages from various ones of channels 37 in trays 29 of the vending machine. Thus, whenever it be becomes necessary or desirable to replenish or restock vending machine 21 with replacement bottles 31R of the vended beverages, as seen in FIG. 7, such replacement bottles may be manually loaded or inserted into channel 37 through open end 73 thereof, as discussed below.

Figure 7:
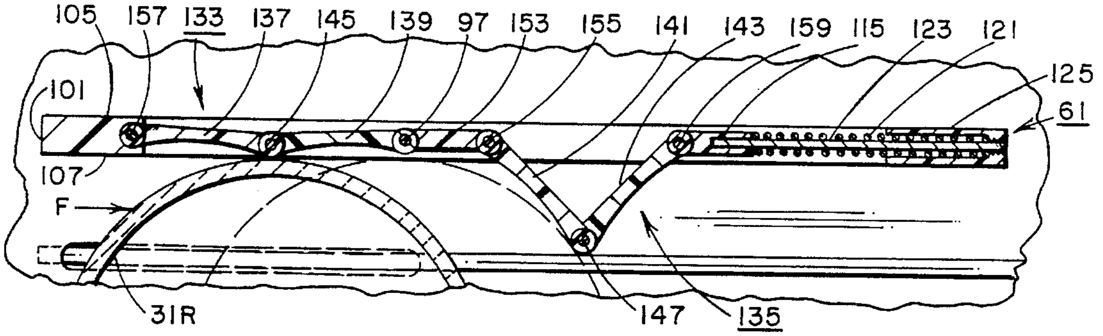
FIG. 7 is a fragmentary view taken from FIG. 5 and illustrating manual insertion of a replacement bottle of the vended beverages into a tray channel of the vending machine.

To replenish the supply of replacement bottles 31R of the vended beverages in vending machine 21, an operator (not shown) opens front panel 25*a* of cabinet 23 (FIG. 1) thereby to provide access to the interior of the cabinet, and the replacement bottles are successively inserted by the operator into respective ones of channel 37, as seen in FIG. 7. An operator applied or manual force F exerted by the operator on replacement bottles 31R engages it with pivoted member 137 of abutment means 133 to manually urge or move the abutment means from its channel blocking position, as shown in FIG. 5, to its channel opening position thereby to effect the passage of the replacement bottle in the channel past abutment means 133.

Figure 8:
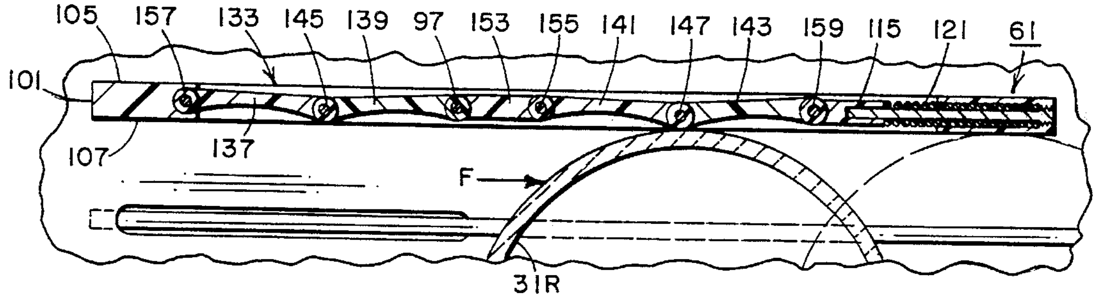
FIG. 8 is generally the same as FIG. 7 illustrating further manual insertion of the replacement bottle.

Of course, upon the manual movement of abutment means 133 into its channel opening position, as discussed above, the manual force F overcomes the compressive force of solenoid spring 95 acting on hinge pin 97, and the hinge pin is moved in guide slot 113 toward engagement with opposite end 131 thereof, as previously discussed and as best seen in FIG. 4. This movement of hinge pin 97 in guide slot 113 is transmitted through pivot connector 153 to abutment means 135 urging it from the channel opening position toward the channel blocking position thereof, as seen in FIG. 7; however, when the manual force F acting on replacement bottle 31R engages it with pivoted member 141 of abutment means 35, manual force F overcomes the compressive force of spring 121 which yields to provide sliding movement of anchor slide 115 in guide slot 111 of casing 101 displacing the anchor slide from opposite end 117 of the guide slot toward engagement with opposite end 119 thereof, as seen in FIG. 4. This sliding movement of anchor slide 115 in guide slot 111 permits the conjoint movement therewith of abutment means 135 from its channel blocking position toward its channel opening position, as seen in FIG. 8. As replacement bottle 31R is manually advanced in channel 37 in engagement with abutment means 135, the replacement bottle subsequently is disengaged from abutment means 133; therefore, upon the disengagement of replacement bottle 31R from abutment means 133, the compressive force of solenoid spring 95 and anchor slide spring 121 acting on hinge pin 97 and anchor slide 115 reengage them with opposite ends 129,117 of guide slot 113,111, respectively. Of course, when hinge pin 97 and anchor slide 115 are respectively engaged with opposite ends 129,117 of guide slots 113,111, as discussed above, abutment means 133 is returned to its channel blocking position, and abutment means 135 is relocated in its channel opening position thereby to permit the manual passage or advancement of replacement bottle 31R in channel 37 past abutment means

135. To complete the description of the replenishment of vending machine 21 with replacement bottles 31R of the vended beverages, as many of the replacement bottles as necessary or as desired may be subsequently manually inserted by an operator into channels 37 of trays 29 in cabinet 23 of the vending machine generally in the same manner as discussed hereinabove.

Figure 9:
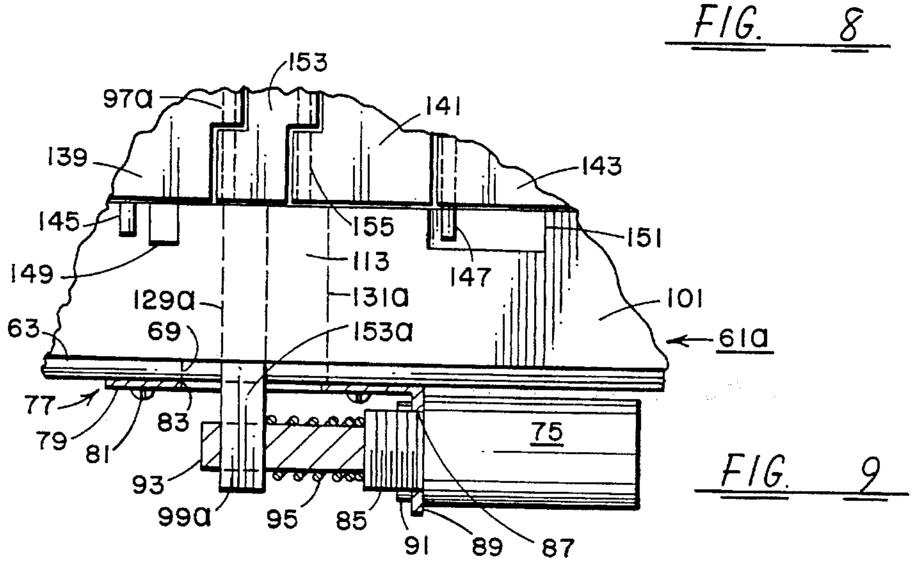
FIG. 9 is a fragmentary side elevational view showing an alternative release mechanism in one form of the invention.

An alternative release mechanism 61a in one form of the invention is in part illustrated in FIG. 9 for utilization in vending machine 21, and release mechanism **61*a* has generally the same component parts operable generally in the same manner as those of the previously described release mechanism 61** with the exceptions noted below.

Pivot connector 153 of release mechanism **61*a* is pivotally interconnected by a hinge pin 97*a* to pivot member 139 of abutment means 133, and an extension 153*a* integral with the pivot connector extends through guide slot 113 of casing 101, aligned slots 69,83 of lip 63 and solenoid mounting bracket 77, respectively, so as to be disposed in a receiving opening 99*a* therefor of solenoid armature 93. Pivot connector extension 153*a* is reciprocally or slidably movable in guide slot 113 of casing 101 between a pair of predeterminately spaced apart opposite abutment or end surfaces 129*a*,131*a* of the guide slot, and the compressive force of solenoid spring 95 acts on the pivot connector extension to displace it from opposite end 131a of the guide slot into seating or abutting engagement with opposite end 129*a* thereof when solenoid armature 93 is in its de-energized position, as shown in FIG. 9. Thus, when solenoid spring 95 urges pivot connector extension 153*a* into engagement with opposite end 129*a* of guide slot 113 in casing 101, abutment means 133,135 are respectively disposed in their channel blocking position and channel opening positions, as previously discussed. Of course, upon the energization of solenoid armature 95 into its energized position, pivot connector extension 153*a* is conjointly movable with the armature being slidable in guide slot 113 into engagement with opposite end 131*a* thereof. Thus, when pivot connector extension 153*a* is so moved into engagement with opposite end 131*a* of guide slot 113, abutment means 133,135 are disposed in their channel opening position and channel blocking positions, respectively, as previously discussed. To complete the discussion relating to alternative release mechanism 61*a*, it may be noted that pivot connector 153 and its extension 153*a* comprise a driving means reciprocally movable in casing 101 and extending in part into opening 109 thereof into pivotal association with abutment means 133,135** for driving them between their respective channel opening and blocking positions, as previously discussed.

Figure 11:
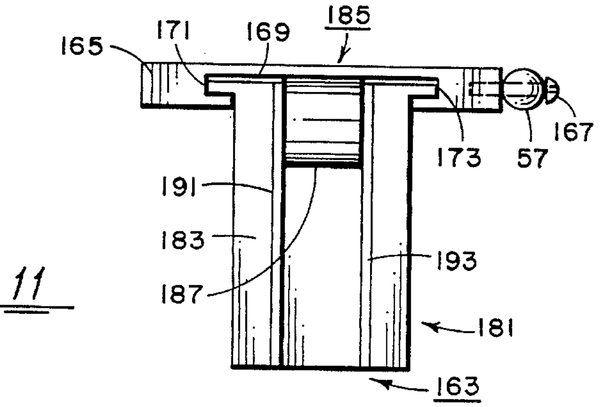
FIG. 11 is a sectional view taken along line 11—11 in FIG. 10.
Figure 10:
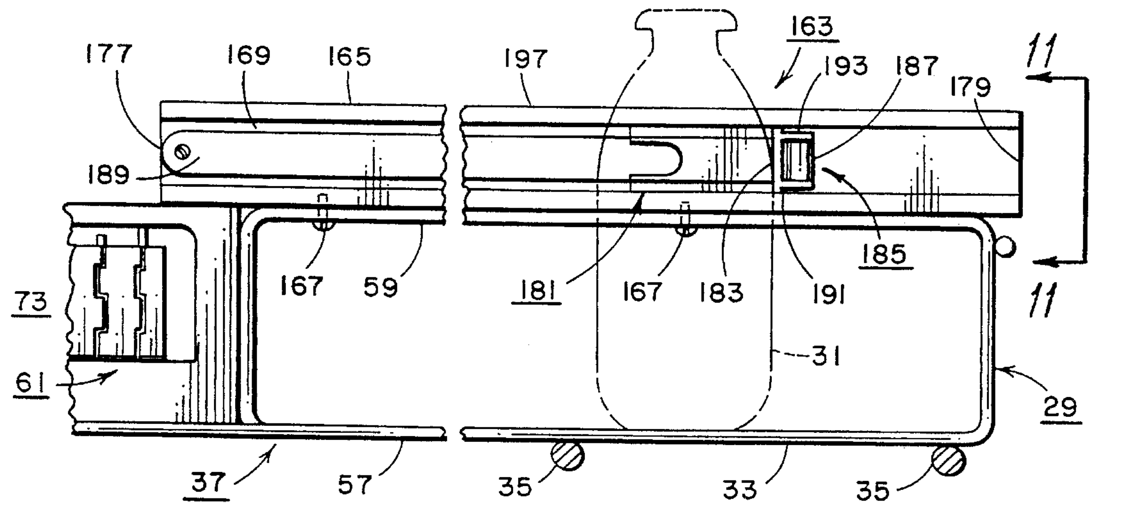
FIG. 10 is a fragmentary partial sectional view showing a pusher device associated with a tray channel of the vending machine in one form of the invention.

In FIGS. 10 and 11, a pushing device 163 is provided for utilization with channel 37 of vending machine 21 in one form of the invention. Each channel 37 of tray 29 is provided with a pushing device 163 for resiliently urging bottles 31 in the row formation thereof in such channels toward their open ends 73, respectively; however, for the sake of brevity of disclosure and drawing simplification, only one channel 37 and its pushing device 163 is shown in FIGS. 10 and 11.

Pushing device 163 is provided with a generally elongate base 165 extending along opposite side 59 of channel 37 and in part along casing 101 of release mechanism 61, and the base is secured or otherwise mounted to opposite side 59 of channel 37 by suitable means, such as for instance a plurality of screws 167 or the like. Base 165 may be formed of any suitable material, such as a metal or a plastic for instance or the like, and a recess 169 is provided in the base between a pair of generally opposed grooves 171,173 with both the recess and opposed grooves respectively intersecting a pair of opposite ends 177,179 on the base. A slide or pusher 181 is slidably received in recess 169 and opposed grooves 171,173 of base 165, and an arm 183 integral with the pusher extends from the base into channel 37 for engagement with the last one of bottles 31 in the row formation thereof in the channel. A resilient means, such as a constant force spring 185 or the like for instance, is formed of a suitable strip material, such as a spring steel or the like for instance, which is spirally wound upon itself into a coil 187 having an outer or free end 189. Coil 187 of spring 185 is loosely retained or otherwise mounted between a pair of spaced flanges 191,193 integrally provided on pusher arm 183, and the spring is disposed between pusher 181 and base 165 extending along recess 169 with free end 189 of the spring being fixedly secured to the base adjacent opposite end 177 thereof. Thus, with coil 187 of spring 185 carried on pusher 181 and free end 189 of the spring secured to base 165 adjacent opposite end 177 thereof, the constant force of the spring is exerted on the pusher urging it generally lengthwise along the base into abutment with the last bottle in the row formation thereof in channel 37. Since bottles 31 are engaged with each other in the row formation of the bottles in channel 37, the constant force of spring 185 is transmitted from pusher arm 183 onto the bottles to slidably urge them along base 57 of channel 37 toward open end 73 thereof to be controllably dispensed from the channel by release mechanism 61, as previously discussed. Thus, the constant force of spring 185 supplements the gravity feed imparted to bottles 31 by the previously mentioned mounting of tray 29 at the preselected angle A in cabinet 23 of vending machine 21 thereby to ensure the sliding displacement of the bottles in channel 31 toward the open end 73 thereof.

Figure 13:
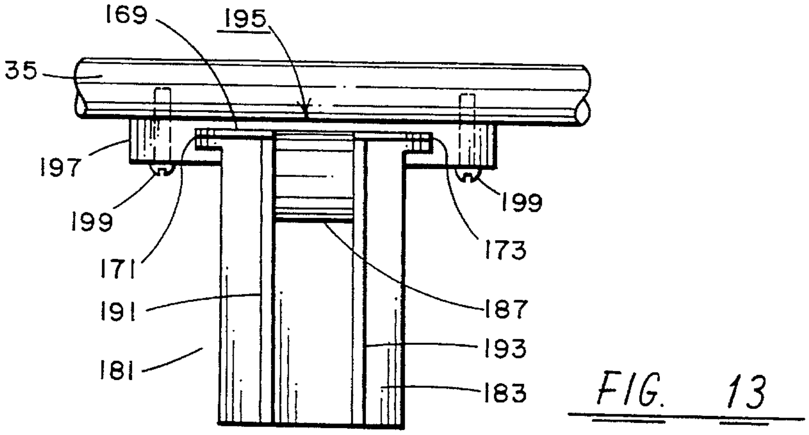
FIG. 13 is a sectional view taken along line 13—13 in FIG. 12.
Figure 12:
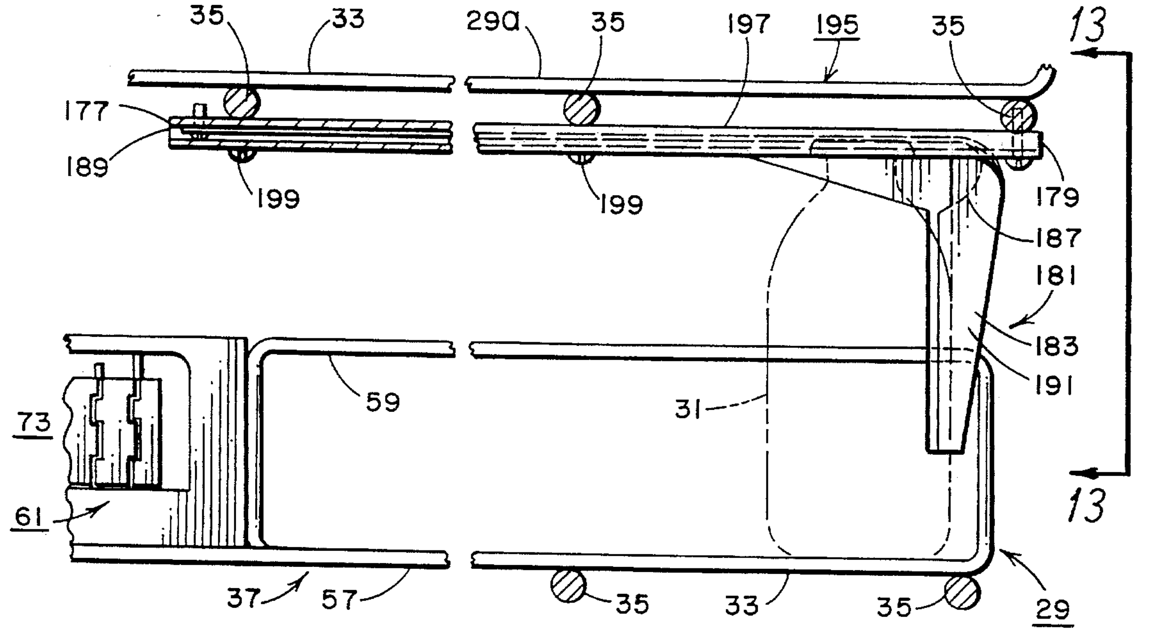
FIG. 12 is a fragmentary partial sectional view showing an alternative pusher device for a tray channel of the vending machine in one form of the invention.

In FIGS. 12 and 13, an alternative pushing device 195 is illustrated for utilization in vending machine 21 in one form of the invention, and alternative pushing device 195 has generally the same component parts operable generally in the same manner as those of the previously discussed pushing device 163 with the exceptions noted below.

Each channel 37 of tray 29 is provided with one of pushing device 195 for resiliently urging bottles 31 in their row formation in channel 37 toward open end 73 thereof; however, for the sake of brevity of disclosure and drawing simplification, only one channel 37 and its pushing device 195 is shown in FIGS. 12 and 13. Except for dimensional differences, a base 197 of pushing device 195 is the same as base 165 for the previously described pushing device 163; however, as discussed in greater detail hereinafter, it may be noted while pushing device 195 is associated with bottles 31 in the row formation thereof in channel 37 of tray 29, pushing device 195 is mounted to another tray **29*a* spaced or mounted immediately above tray 29 in cabinet 23 of vending machine 21, as discussed below. Base 197 of pushing device 195 is fixedly secured or otherwise mounted by suitable means, such as a plurality of screws 199 or the like for instance, to at least some of cross-rods 35 of tray 29*a* so as to be disposed above and extend along channel 37 of tray 29. Of course, arm 183 on pusher 181 depends from base 197 of pushing device 195 into channels 37 for abutting or pushing engagement with the last one of the bottles 31 in the row formation of the bottles in channel 37**.

While pushing device 163 is associated with tray 29, as seen in FIGS. 10 and 11, and pushing device 195 is associated with adjacent trays, as seen in FIGS. 12 and 13, such trays are described hereinabove as being mounted in cabinet 23 of vending machine 21 in sloping or ramped relation at the preselected angle A; however, it is contemplated that the pushing devices would be effective to cause the sliding of bottles 31 along channel 37 so as to be displaced through open end 73 thereof past release mechanism 61 even if the trays were generally horizontally mounted, i.e. without sloping, in the cabinet of the vending machine within the scope of the invention.

Figure 14:
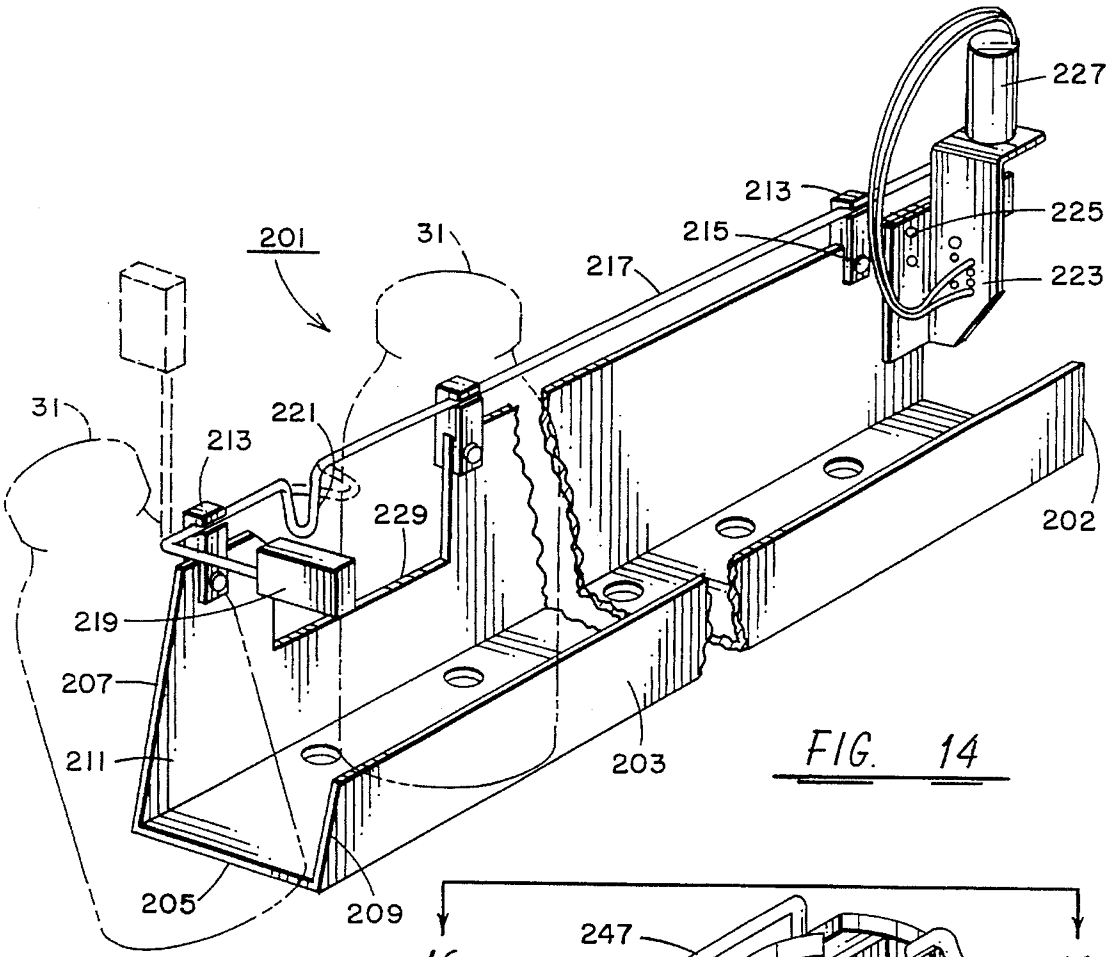
FIG. 14 is a fragmentary perspective view of an alternative release mechanism in one form of the invention associated with a tray channel of the vending machine.

In FIG. 14, another alternative release mechanism 201 is illustrated for utilization in vending machine 21 in one form of the invention, and release mechanism 201 has generally the same component parts operable generally in the same manner as the previously described release mechanism 61 with the exceptions noted below.

A tray 202 adapted to be disposed in cabinet 23 of vending machine 21 generally in the same manner as the previously described trays is provided with a plurality of channels 203 arranged generally in side-by-side relation with each channel having one of release mechanisms 201 associated therewith; however, for the sake of brevity of discussion and drawing simplification, only one such channel and release mechanism is shown in FIG. 14. Channel 203 is provided with a base 205 interposed between a pair of generally opposite sidewalls 207,209 with sidewall 209 being partially broken away for clarity, and the channel may be formed of any suitable material, such as a metal, a plastic, or a metal coated with a plastic for instance or the like. Of course, bottles 31 arranged generally in engagement and in row formation with each other in channel 203 so as to be slidable on base 205 between opposite sidewalls 207,209 toward an open end 211 of the channel.

A plurality of bearing mounts 213 are secured by suitable means, such as screws 215 or the like for instance, to opposite sidewall 207 for rotatably or pivotally receiving a shaft or driving means 217 for a pair of abutments or abutment means 219,221 pivotally associated with the shaft. A bracket 223 is secured to opposite sidewall 207 by suitable means, such as a plurality of screws 225 or the like for instance, for mounting a solenoid 227 having its armature (not shown) drivingly interconnected with shaft 217, and the solenoid is of the type having an internal resilient means or spring for returning its armature from an energized position to a de-energized position in response to the energization and de-energization of the solenoid.

When solenoid 227 is de-energized, abutment means 219 is disposed in a channel blocking position extending generally from sidewall 219 into channel 203 adjacent open end 211 thereof for engagement with a leading one of bottles 31 in their row formation in the channel, as seen in solid outline in FIG. 14. When abutment means 219 is in its channel blocking position, abutment means 221 is disposed in a channel opening position extending at least in part into a recess or opening 229 in sidewall 207 so as to be disengaged from any bottle 31 in the row formation thereof in channel 203, as seen in solid outline in FIG. 14. Thus, with abutment means 219 in its channel blocking position and abutment means 221 with channel opening position, the engagement of abutment means 217 with the leading one of bottles 31 in the row formation thereof in channel 203 obviates the sliding displacements of the bottles in the channel toward open end 211 thereof.

Solenoid 227 is energized in response to the generation of the aforementioned preselected vending signal in vending machine 21, and upon its energization, the solenoid pivots shaft 217 in its bearing mounts 213 thereby to conjointly pivot abutment means 217,219 into their respective channel opening position and channel closing positions, as shown in dotted outline in FIG. 14. When so pivoted to its channel opening position, abutment means 219 is disengaged from the leading one of bottles 31 in their row formation in channel 203, and such leading one of the bottles slides on base 205 of the channel through open end 211 thereof being dispensed into a receptacle (not shown) in vending machine 21 accessible to the purchaser of the dispensed bottle.

As abutment means 219 is pivoted into its channel opening position in response to the energization of solenoid 227, abutment means 221 is conjointly pivoted into its channel blocking position engaging another bottle 31 arranged in the row formation thereof next adjacent or successive to the aforementioned leading bottle dispensed from channel 203. Thus, the engagement of abutment means 221 with bottle 31 next adjacent the aforementioned leading bottle dispensed from channel 203 obviates the sliding displacement of the remaining bottles in their row formation in the channel toward open end 211 thereof when abutment means 219 is in its channel opening position.

Upon the termination of the aforementioned preselected vending signal generated in vending machine 21, solenoid 227 is de-energized thereby to effect the return pivoting of shaft 217 in bearing mounts 213, and such return pivotal movement of the shaft effects the conjoint return pivotal movement of abutment means 219,221 into their respective channel blocking position and channel opening position, as shown in solid outline in FIG. 14. Upon the return of abutment means 221 into its channel opening position, abutment means 221 is disengaged from any of bottles 31 in the row formation thereof in channel 203; therefore, the remaining bottles in the channel are slidable by gravity feed in the channel toward open end 211 thereof. As abutment means 221 is pivotally returned to its channel opening position, abutment means 219 is conjointly pivotally returned to its channel blocking position. Of course, in its channel blocking position, abutment means 219 engages the now leading one of the remaining bottles 31 in the row formation thereof in channel 203 thereby to obviate further sliding displacement of the bottles in the channel toward the open end thereof. The above described operation of release mechanism 201 in vending machine 21 may be subsequently repeated in response to the subsequent generation of a plurality of the aforementioned preselected vending signals to further effect the displacement of bottles 31 of the vended beverages from vending machine 21.

Figure 16:
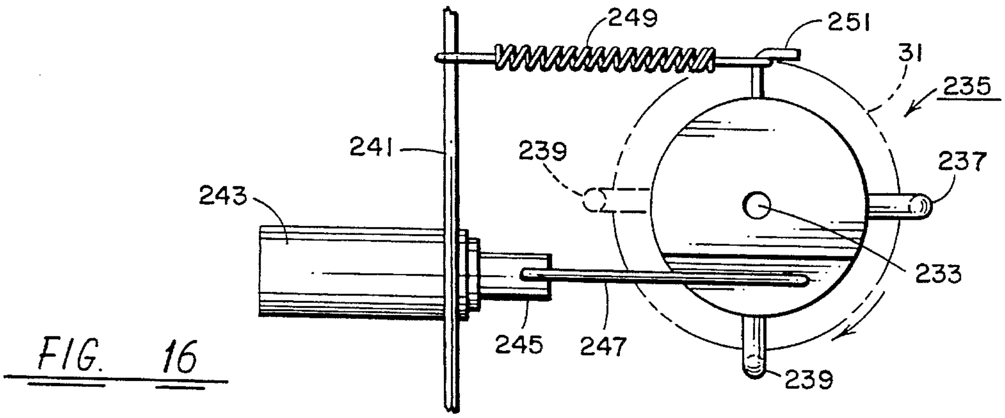
FIG. 16 is a partial top elevational view of the alternative release mechanism of FIG. 15.
Figure 15:
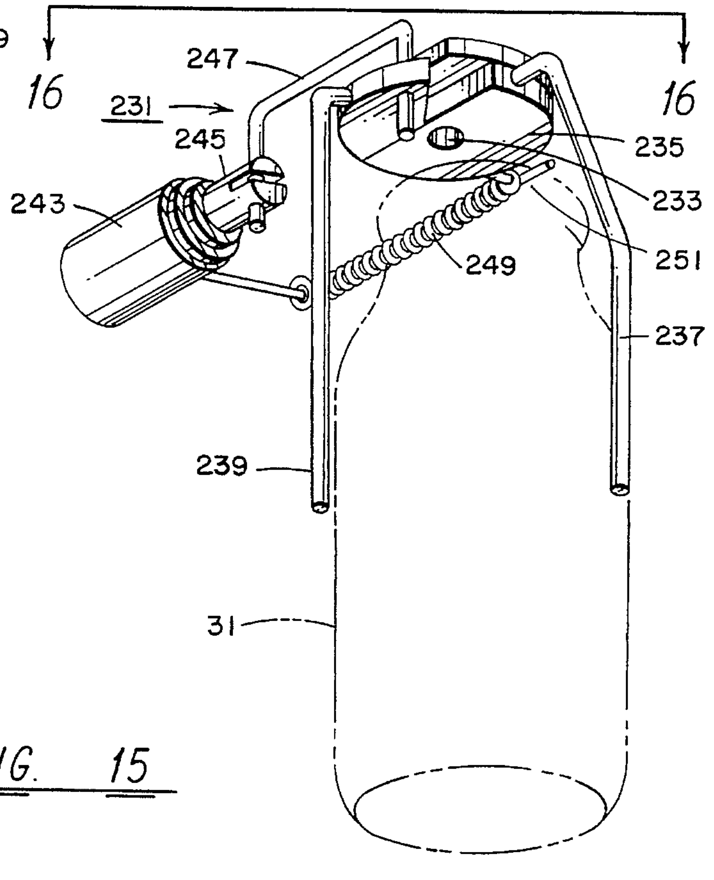
FIG. 15 is a fragmentary side elevational view of another alternative release mechanism in one form of the invention associated with a tray channel of the vending machine.

In FIGS. 15 and 16, still another alternative release mechanism 231 is illustrated for use in vending machine 21 in one form of the invention, and release mechanism 231 has generally the same component part operable generally in the same manner as those of the previously described release mechanism 61,201 with the exceptions noted below.

Release mechanism 231 is arranged generally adjacent open end 211 of channel 203 above base 205 thereof in tray 202; however, for the purpose of drawing simplification, tray 202 is omitted from FIGS. 15 and 16. A pivot pin 233 is threadedly secured in depending relation to the channel base 205 in another tray (not shown) mounted immediately above tray 202 in cabinet 23 of vending machine 21 generally in the same manner as previously discussed. A built-up pivot block or pivot assembly 235 is pivotally or rotatably received about pivot pin 233, and a pair of abutment arms or abutment means 237,239 arranged in predetermined circumferentially spaced apart relation on the pivot pin depend therefrom toward channel 203 for respective engagement with bottles 31 in the row formation thereof in the channel, as further discussed below.

A mounting bracket 241 carrying a solenoid 243 is also mounted to the channel base 205 of the aforementioned tray (not shown) mounted immediately above tray 202 in cabinet 23 of vending machine 21, and an armature 245 of the solenoid is pivotally interconnected by a pivot link or drive means 247. Resilient means, such as for instance a spring 249 or the like, is biased between solenoid mounting bracket 241 and a finger 251 extending generally circumferentially from pivot assembly 235, and when solenoid 243 is de-energized, the compressive force of spring 249 is transmitted through the pivot assembly and link 247 urging solenoid armature 245 to its de-energized position and urging abutment means 237,239 into a channel blocking position and a channel opening position, respectively, as seen in FIG. 15. To complete the description of release mechanism 231, it may be noted that abutment means 237 in its channel blocking position is engaged with the lead one of bottles 31 in the row formation thereof in channel 203 thereby to retain the bottles against sliding displacement by gravity feed from the channel through open end 211 thereof, and when abutment means 237 is in its channel blocking position, abutment means 239 is in its channel opening position disengaged from any of the bottles in the channel.

Upon the generation of the preselected vending signal in vending machine 21, as previously discussed, solenoid 243 is energized moving armature 245 into its energized position, and such armature movement is translated by pivot link 247 to pivotally drive or move pivot assembly 235 about pivot pin 233 against the compressive force of spring 249, as illustrated by the directional arrow in FIG. 16. In response to the above discussed pivotal movement of pivot assembly 235, abutment means 237 is pivoted from its channel blocking position into a channel passing position disengaged from the lead one of bottles 31 in the row formation thereof in channel 203, i.e., generally the same position of abutment means 239 in FIG. 16, and abutment means 239 is conjointly pivoted from its channel opening position into a channel blocking position disposed in engagement with another bottle next adjacent or successive to the aforementioned lead bottle in the row formation of the bottles in channel 203, as shown in dotted outline in FIG. 16. When abutment means 237 is pivotally moved into its channel opening position disengaged from the lead bottle in the row formation of bottles 31 in channel 203, as discussed above, such lead bottle is slidably movable by gravity feed on base 205 of channel 203 through open end 211 thereof so as to be dispensed into a receptacle (not shown) in vending machine 21 accessible to the purchaser, as previously discussed. It may be noted that the conjoint pivotal movement of abutment means 239 into its channel blocking position engaged with the aforementioned next successive bottle in the row formation of bottles 31 in channel 203 obviates the sliding displacement by gravity feed of the remaining bottles in channel 203 toward open end 211 thereof.

When the aforementioned preselected vending signal is terminated in vending machine 21, solenoid 243 is de-energized and the compressive force of spring 249 effects the pivotal return movement of pivot assembly 235 about pivot pin 233, and the pivotal return movement of pivot assembly 235 is translated through pivot link 247 to solenoid armature 245 returning it to its de-energized position. In response to the above discussed return pivotal movement of pivot assembly 235, abutment means 237 is conjointly pivotally returned into its channel blocking position, and abutment means 239 is conjointly pivotally returned into its channel opening position. Upon the return pivotal movement of abutment means 239 to its channel opening position, abutment means 239 is disengaged from the aforementioned next successive bottle in the row formation of bottles 31 in channel 203; therefore, the remaining bottles in the row formation thereof are slidably displaced by gravity feed in the channel until the aforementioned next successive bottle engages abutment means 237 in its channel closing position. Of course, the above described operation of release mechanism 231 in vending machine 21 may be subsequently repeated in response to the subsequent generation of a plurality of the aforementioned preselected vending signals to further effect the displacement of bottles 31 of the vended beverages from vending machine 21.

From the foregoing, it is apparent that a novel vending machine 21 and novel release mechanisms 61 and 61*a* have been presented, and it is contemplated that various changes in the precise details and connections of the component parts in such vending machine and release mechanisms may be made by those having ordinary skill in the art without departing from the spirit of the invention or the scope of the invention as defined by the claims which follow.

What is claimed is:

1. A vending machine for selectively vending a plurality of vended articles comprising:

a cabinet;

at least one supporting means arranged in said cabinet for slidably receiving the vended articles in row formation thereon and including at least one channel having an open end and a pair of generally opposite sidewalls to slidably guide the vended articles in row formation on said at least one supporting means within said at least one channel toward said open end thereof with adjacent vended articles in the row formation being engaged;

a casing disposed generally in alignment with one of said opposite sidewalls adjacent said open end of said at least one channel and mounted to said at least one supporting means, said casing including a pair of generally opposite faces with one of said opposite faces being disposed at least adjacent some of the vended articles in the row formation thereof in said at least one channel, and an opening in said casing intersecting at least said one opposite face thereof;

a pair of sets of hinged means associated with said casing within said opening and operable generally for movement between a pair of positions, one of said hinged means sets in one of its positions being disposed at least in part within said opening of said casing so as to be disengaged from one of the vended articles disposed in the row formation adjacent said open end of said at least one channel to permit the sliding displacement of the one vended article from said at least one supporting means through said open end of said at least one channel and the other of said, hinged means sets in one of its positions extending at least in part from said opening in said casing beyond said one opposite face thereof into said at least one channel so as to be engaged with another of the vended articles next adjacent the displaced one vended article in the row formation to retain the remaining vended articles in the row formation against sliding displacement on said at least one supporting means in said at least one channel thereof when said one hinged means set is in its one position, said other hinged means set being movable to the other of its positions disposed at least in part within said opening of said casing so as to be disengaged from the another vended article in the row formation to permit the sliding displacement of the remaining vended articles in the row formation on said at least one supporting means toward said open end of said at least one channel and said one hinged means set being movable to the other of its positions extending at least in part from said opening beyond said one opposite face of said casing into engagement with the another vended article to retain the remaining vended articles in the row formation against sliding displacement from said at least one supporting means through said open end of said at least one channel upon the movement of said other hinged means set to its other position;

a pivot connector reciprocally movable within said opening in said casing between said hinged means sets; and a pair of hinge .pins disposed at least in part within said opening in said casing and pivotally interconnected between said pivot connector and adjacent ones of said hinged means of said hinged means sets, respectively, one of said pivot connector and one of said hinge pins being responsive to opposite forces selectively applied thereto to effect the reciprocal movement of said pivot connector conjointly with the respective movements of said hinged means sets between the one and other positions thereof.

2. The vending machine as set forth in claim 1 further comprising solenoid means energized in response to the establishment of a preselected vending signal and drivingly interconnected with said one of said pivot connector and said one hinge pin for effecting movement of said pivot connector within said opening in said casing and the conjoint movement therewith of said hinged means sets to the other positions thereof, respectively.

3. The vending machine as set forth in claim 2 wherein said solenoid means includes resilient means engaged with said one of said pivot connector and said one hinge pin for effecting the movement of said pivot connector within said opening in said casing and the conjoint movement therewith of said hinged means sets to the one positions thereof, respectively, upon the termination of the preselected vending signal to effect the de-energization of said solenoid means.

4. The vending machine as set forth in claim 1 further comprising another supporting means in said cabinet disposed adjacent said at least one supporting means, and resilient means associated with one of said at least one supporting means and said another supporting means and engaged with the last of the vended articles in the row formation for exerting a generally constant resilient force thereon and urging the vended articles on said at least one supporting means in said at least one channel toward said open end thereof.

5. The vending machine as set forth in claim 1 wherein said at least one supporting means comprises a ramp arranged in said cabinet on a preselected slope toward said open end of said at least one channel, the force of gravity acting on the vended articles in the row formation to slidably urge the vended articles on said ramp toward said open end of said at least one channel.

6. The vending machine as set forth in claim 5 further comprising another supporting means in said cabinet disposed adjacent said at least one supporting means, and resilient means associated with one of said ramp and said another supporting means and engaged with the last of the vended articles in the row formation for applying a generally constant resilient force on the vended articles in the row formation to at least assist the force of gravity in slidably urging the vended articles on said ramp in said at least one channel toward said open end thereof.

7. The vending machine as set forth in claim 1 wherein said at least one supporting means includes a sloped portion in said at least one channel adjacent said open end thereof, the one vended article extending at least in part in spaced overlaying relation with said sloped portion when said one hinged means set is in its other position engaged with the one vended article.

8. The vending machine as set forth in claim 7 wherein said at least one supporting means includes slide means blending at least in part with said sloped portion for at least in part slidably seating the one vended article in the row formation, and a depending lip on said slide means extending beyond said sloped portion.

9. A release mechanism for controlling the passage thereby of a plurality of vended articles arranged generally in row formation between a pair of opposite sidewalls of at least one channel slidably supporting the vended articles in a vending machine with said at least one channel having an open end, the release mechanism comprising:

casing means for disposition generally in alignment with one of the opposite sidewalls adjacent the open end of the at least one channel, said casing means including a pair of generally opposite faces with one of said opposite faces arranged at least adjacent some of the vended articles in the row formation in the at least one channel, and an opening in said casing means intersecting at least said one opposite face;

a pair of sets of hinged means pivotally arranged within said opening of said casing means for movement between one position extending in part from said opening beyond said one opposite face into passage preventing engagement with one of the vended articles in the row formation and another position disposed at least in part within said opening in said casing means in passage permitting disengagement from another of the vended articles adjacent the one vended article in the row formation, respectively;

connector means interposed between said hinged means sets and arranged for selective movement in a pair of opposite directions within said opening in said casing means; and a set of means movable at least in part within said opening in said casing means for pivotal engagement between said connector means and adjacent ones of said hinged means of said hinged means sets, respectively, one of said connector means and one of said pivotal engagement means having a distal end extending in part exteriorly of said casing means between said opposite faces thereof for selective subjection to a pair of opposite applied forces to effect the respective selective movements of said connector means conjointly with the respective movements of said hinged means sets between the one and another positions thereof.

10. The release mechanism as set forth in claim 9 further comprising means disposed within said opening of said casing means for pivotally interconnecting another of said hinged means of said one hinged means set with said casing means.

11. The release mechanism as set forth in claim 9 further comprising anchor means disposed in a preselected position in said casing means and extending at least in part into said opening for pivotal interconnection with another of said hinged means of said other hinged means set.

12. The release mechanism as set forth in claim 11 further comprising resilient means disposed within said opening in said casing means and biased between said casing means and said anchor means for resiliently urging said anchor means toward its preselected position in engagement with a part of said casing means, said anchor means being displaced from its preselected position against the compressive force of said resilient means to accommodate movement of said other hinged means set from the one position toward the another position thereof when said one hinged means set is in its another position upon the manual insertion of replacement ones of the vended articles into engagement with said other hinged means set thereby to replenish the vended articles in the row formation thereof.

13. The release mechanism as set forth in claim 9 further comprising solenoid means engaged with said distal end of said one of said connector means and said one pivotal association means and energized in response to the establishment of a preselected vending signal in the vending machine for subjecting said one of said connector means and said one pivotal association means to one of the opposite applied forces to effect the selective movement of said connector means in one of the opposite directions in said casing means and conjointly therewith to move said one hinged means set into its another position and said other hinged means set into its one position.

14. The release mechanism as set forth in claim 13 wherein said solenoid means includes resilient means for resiliently subjecting said one of said connector means and said one pivotal engagement means to the other of the opposite applied force to effect the movement of said connector means in the other of the opposite directions in said casing means and conjointly therewith to move said one hinged means set into its one position and said other hinged means set into its another position when said solenoid means is de-energized.

15. A release mechanism for use in a vending machine comprising:

- a casing including at least one wall interposed between a pair of generally opposite faces, an opening in said casing intersecting at least one of said opposite faces, at least one slot interposed between said opening and said at least one wall, and a pair of generally opposed abutments on said casing within said at least one slot;
- a pair of sets of hinged means pivotally arranged in said casing within said opening and operable generally for conjoint movement between one position disposed at least in part within said opening and another position extending in part from said opening beyond said at least one opposite face, respectively;
- connector means in said casing and arranged for reciprocal movement within said opening;
- a pair of pivot means disposed within said opening in said casing for pivotal interconnection between said connector means and adjacent ones of said hinged means set, respectively; and
- driving means integral with one of said connector means and one of said pivot means and extending through said at least one slot beyond said at least one wall of said casing for reciprocal movement between said opposed abutments into respective engagements therewith, one of said hinged means sets being disposed in its another position and the other of said hinged means sets being disposed in its one position when said driving means is engaged with one of said opposed abutments, and said connector means and said hinged means sets being conjointly movable with said driving means upon its movement from said one opposed abutment into engagement with the other of said opposed abutments to dispose said one hinged means set in its one position and said other hinged means set in its another position.

16. The release mechanism as set forth in claim 15 further comprising resilient means engaged with said driving means for urging it toward engagement with said one opposed abutment.

17. The release mechanism as set forth in claim 15 further comprising solenoid means engaged with said driving means and energized in response to the establishment of a preselected vending signal for moving said driving means from said one opposed abutment into engagement with said other opposed abutment.

18. The release mechanism as set forth in claim 15 further comprising solenoid means arranged in mounted association with said casing at least adjacent said at least one wall thereof and engaged with said driving means for energization in response to the establishment of a preselected vending signal to move said driving means from said one opposed abutment means into engagement with said other opposed abutment means, and said solenoid means including resilient means for urging said driving means from said other opposed abutment into engagement with said one opposed abutment upon the de-energization of said solenoid means.

19. The release mechanism as set forth in claim 15 further comprising a pivot pin interconnected between another of said hinged means of said one hinged means set and said casing within said opening to define the pivotal arrangement of said one hinged means set with said casing.

20. The release mechanism as set forth in claim 15 further comprising another slot in said casing interposed between said opening and saint at least one wall, a pair of generally opposed stops on said casing within said another slot, anchor means movable within said opening and said another slot between said opposed stops for pivotal interconnection with another of said hinged means of said other hinged means set, and resilient means for urging said anchor means into engagement with one of said opposed stops, said anchor means being movable from said one opposed stop toward the other of said opposed stops against the compressive force of said resilient means to accommodate the movement of said other hinged means set from its another position to its one position in response to a manual force exerted on said other hinged means set when said one hinged means set is in its one position.

* * * * *